United States Patent [19]

Morris et al.

[11] Patent Number: 4,803,056

[45] Date of Patent: Feb. 7, 1989

[54] SYSTEM FOR INCREASING THE CAPACITY OF A TITANIUM DIOXIDE PRODUCING PROCESS

[75] Inventors: Alan J. Morris; Merlin D. Coe, both of Oklahoma City, Okla.

[73] Assignee: Kerr-McGee Chemical Corporation, Oklahoma City, Okla.

[21] Appl. No.: 761,329

[22] Filed: Jul. 31, 1985
 (Under 37 CFR 1.47)

Related U.S. Application Data

[63] Continuation of Ser. No. 515,888, Jul. 22, 1983, abandoned.

[51] Int. Cl.$^4$ .................... C01G 23/047; B01J 12/02
[52] U.S. Cl. .................... 422/156; 422/158; 423/613
[58] Field of Search ............... 422/156, 158; 106/300; 423/613

[56] References Cited

U.S. PATENT DOCUMENTS

| | | | |
|---|---|---|---|
| 2,823,982 | 2/1958 | Saladin et al. | 23/202 |
| 3,068,113 | 12/1962 | Strain et al. | 423/613 X |
| 3,069,282 | 12/1962 | Allen | 106/300 |
| 3,203,763 | 8/1965 | Kruse | 23/202 |
| 3,322,499 | 5/1967 | Carpenter et al. | 23/202 |
| 3,414,379 | 12/1968 | Wigginton et al. | 23/202 |
| 3,416,892 | 12/1968 | Hitzemann et al. | 23/202 |
| 3,443,897 | 5/1969 | Wilson et al. | 23/202 |
| 3,463,610 | 8/1969 | Groves et al. | 23/202 |
| 3,485,584 | 12/1969 | Zirngibl et al. | 23/202 |
| 3,485,585 | 12/1969 | Snyder | 23/204 |
| 3,512,219 | 5/1970 | Stern et al. | 23/277 |
| 3,532,462 | 10/1970 | Zirngibl et al. | 23/202 |
| 3,615,202 | 10/1971 | Stern | 23/202 |
| 3,676,060 | 7/1972 | Bedetti | 23/277 R |
| 3,725,526 | 4/1973 | Pieri et al. | 423/613 |
| 3,735,000 | 5/1973 | Calcagno et al. | 423/613 |
| 3,811,908 | 5/1974 | Piccolo et al. | 106/300 |
| 3,914,396 | 10/1975 | Bedetti et al. | 423/613 |

Primary Examiner—Michael S. Marcus
Attorney, Agent, or Firm—William G. Addison

[57] ABSTRACT

A system for increasing the capacity of a process for producing titanium dioxide by reacting titanium tetrachloride vapors with oxygen wherein the process includes an oxygen preheat assembly for preheating oxygen to a predetermined temperature level and a first titanium tetrachloride preheat assembly for preheating titanium tetrachloride to a first, relatively high, temperature level, a portion of the oxygen and the titanium tetrachloride vapors at the first temperature level being reacted in a first reaction zone to produce a mixture of titanium dioxide reaction product, oxygen and unreacted titanium tetrachloride vapors at the first temperature level. The system comprises adding a second titanium tetrachloride preheat assembly for preheating titanium tetrachloride to a second temperature level, substantially below the first temperature level, and adding a second reaction zone adapted for receiving the mixture from the first reaction zone, the titanium tetrachloride vapors at the first temperature level in said mixture and the titanium tetrachloride vapors at the second temperature level being reacted with the oxygen in the mixture from the first reaction zone to produce titanium dioxide. The present invention also contemplates an improved reactor for use in the system for increasing the capacity of the titanium dioxide producing process.

13 Claims, 3 Drawing Sheets

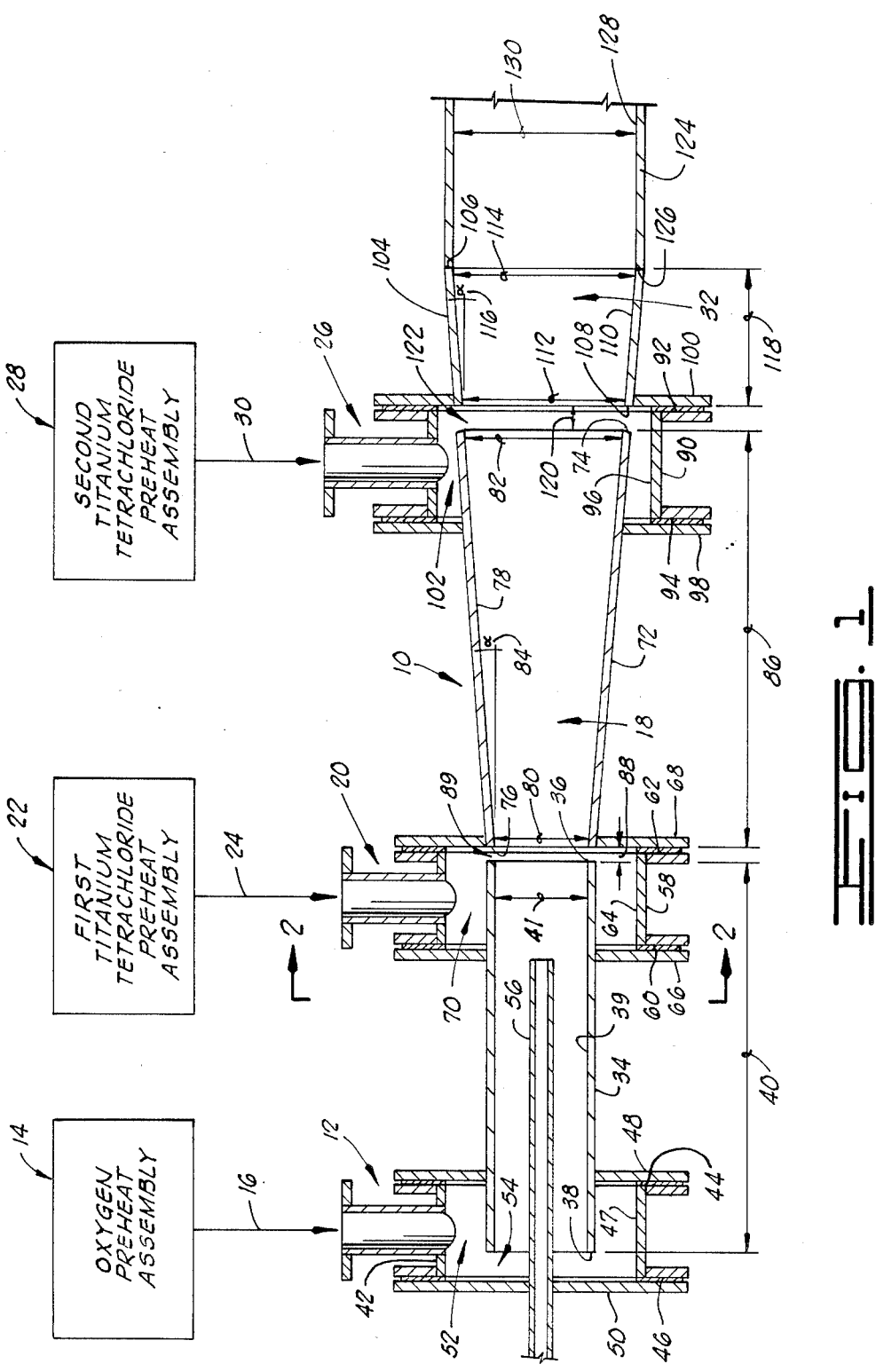

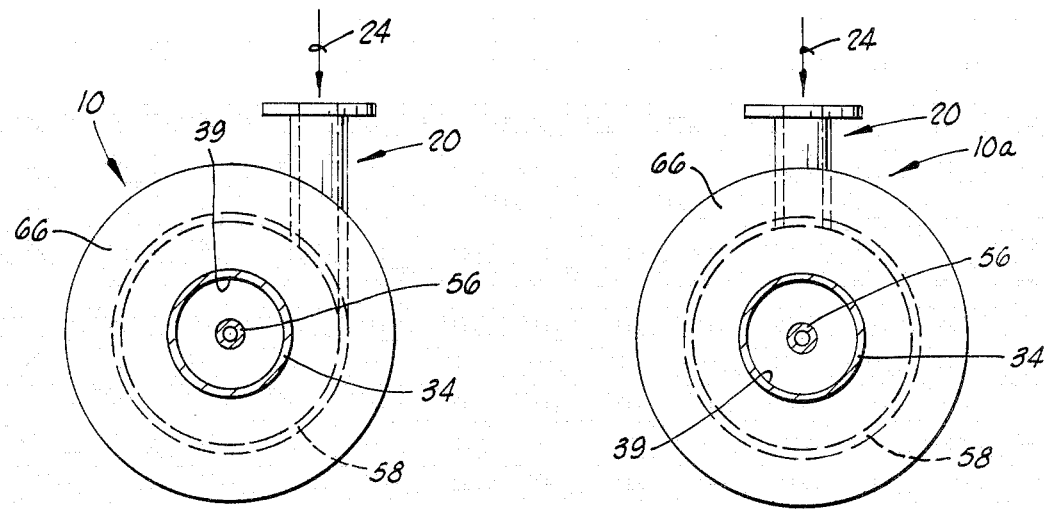
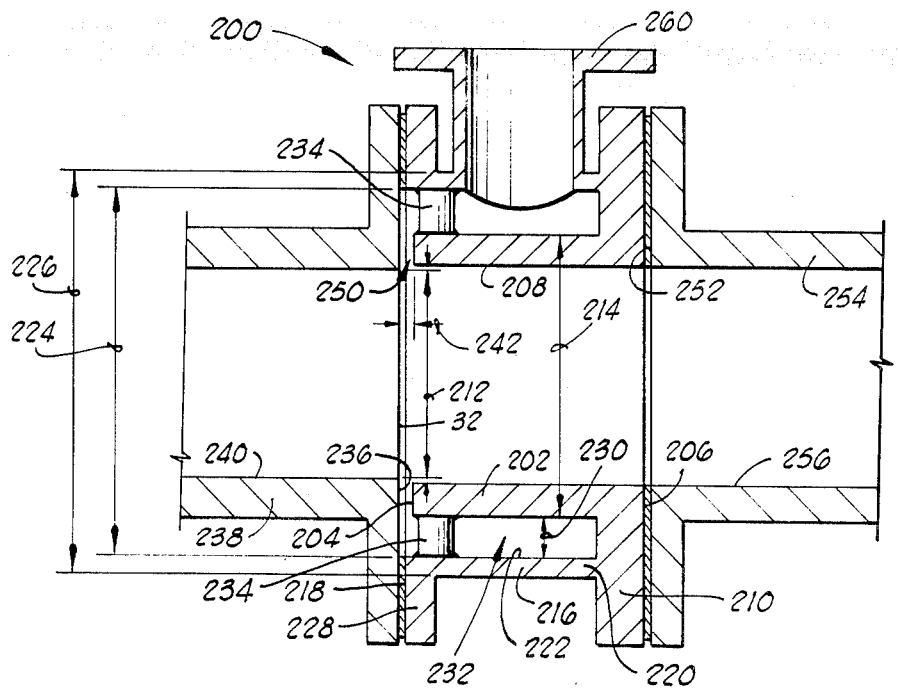
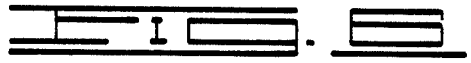

SYSTEM FOR INCREASING THE CAPACITY OF A TITANIUM DIOXIDE PRODUCING PROCESS

This application is a continuation of Ser. No. 515,888, filed July 22, 1983, now abandoned.

BACKGROUND OF THE INVENTION

Field of the Invention

The present invention relates generally to a system for producing titanium dioxide by reacting titanium tetrachloride vapors with oxygen and, more particularly, but not by way of limitation, to a system for increasing the capacity of a titanium dioxide producing process and to an improved reactor for use in such a system.

BRIEF DESCRIPTION OF THE DRAWINGS

FIG. 1 is a cross sectional view of a reactor and a diagrammatic view of the equipment for preheating the oxygen and the titanium tetrachloride vapors for introduction into the reaction zones in the reactor, diagrammatically illustrating the system of the present invention.

FIG. 2 is an end elevation view of the reactor of FIG. 1, taken substantially along the lines 2—2 of FIG. 1.

FIG. 3 is an end elevation view, similar to FIG. 2, but showing a modified reactor.

FIG. 6 is a cross sectional view, similar to FIG. 1, but showing another modified reactor.

DESCRIPTION OF THE PREFERRED EMBODIMENTS

Figure 4:
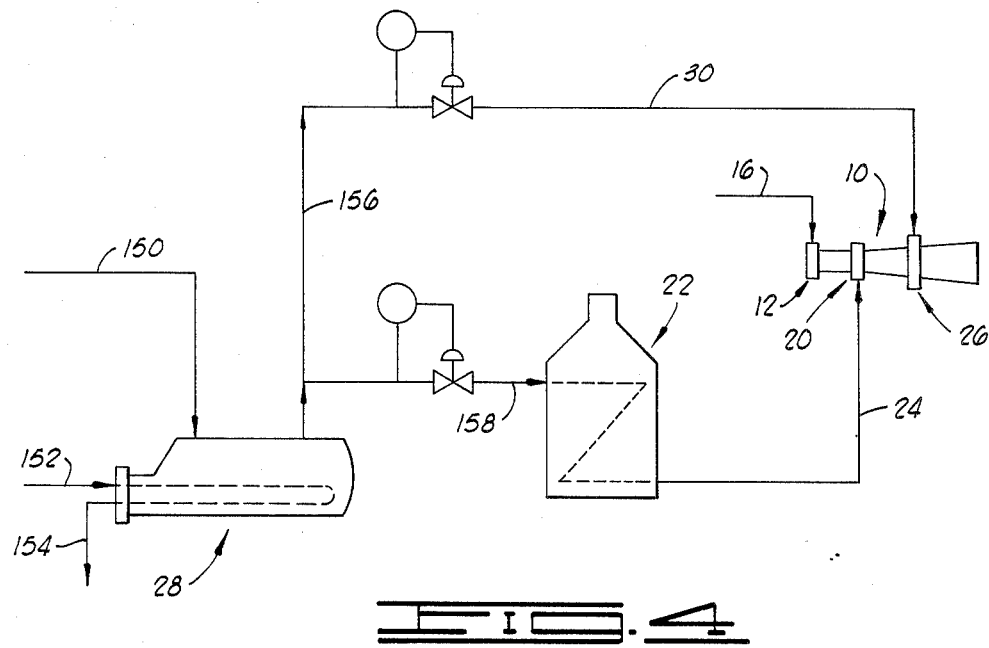
FIG. 4 is a diagrammatic view showing one embodiment of the system of the present invention.

Titanium dioxide, which is useful as a pigment, has been produced on a commercial scale by reacting titanium tetrachloride vapor with oxygen. In one type of titanium tetrachloride-oxygen reactor, a preheated oxidizing gas was passed into a reaction zone and preheated titanium tetrachloride vapor was passed into the same reaction zone where the titanium tetrachloride vapor was reacted with the oxygen contained in the oxidizing gas according to the following reaction:

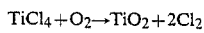

$$TiCl_4 + O_2 \rightarrow TiO_2 + 2Cl_2$$

The combined temperature of the reactants (titanium tetrachloride and oxygen), before reaction, had to be at least 1600° F. in order to sustain the oxidation reaction and, preferably, the combined temperature of the reactants was between about 1650° F. and about 1800° F. In one operable embodiment, the oxidizing gas was preheated for introduction into the reaction zone to a temperature of about 1800° F. and the titanium tetrachloride vapor was preheated for introduction into the reaction zone to a temperature of about 1750° F.

Titanium tetrachloride vapors at relatively high temperatures of about 1750° F., for example, are highly corrosive and, thus, the preheating equipment utilized for preheating such titanium tetrachloride vapors has been extremely expensive. It is highly desirable to develop a system for producing titanium dioxide by reacting titanium tetrachloride vapor with oxygen utilizing titanium tetrachloride vapors preheated to minimum temperature levels, such as below 400° F., for example, since this would permit the utilization of less expensive equipment for preheating the titanium tetrachloride. The present invention provides a system for increasing the capacity of a titanium dioxide producing process in a more efficient and more economical manner.

A reactor of the type which has been utilized in the process for producing titanium dioxide by reacting titanium tetrachloride vapor with oxygen in the manner just generally described was disclosed in U.S. Pat. No. 3,512,219, issued to Stern, et al. and the disclosure of the Stern, et al. patent specifically hereby is incorporated herein by reference.

In this prior process, pure oxygen was heated in a radiant tube furnace. In one operable embodiment, the oxygen only could be heated to a maximum temperature of about 1800° F. due primarily to the thermal efficiency and the materials of construction of the particular oxygen preheating apparatus. Thus, in this process, the titanium tetrachloride vapors also had to be heated to a temperature of about 1800° F. in the titanium tetrachloride vapor preheating apparatus. In the alternative, additional oxygen preheating equipment might be added to the existing oxygen preheating equipment in an effort to elevate the oxygen temperature to a level above 1800° F., thereby permitting the utilization of titanium tetrachloride vapors which have been preheated to lower temperature levels, below 1800° F. However, the additional oxygen preheating equipment represents a substantial expense and such expense might not be offset by any savings in the titanium tetrachloride vapor preheating apparatus resulting from the lower temperature requirements for the titanium tetrachloride vapors.

In the operable process referred to before, the titanium tetrachloride vapor preheating equipment utilized silica pipe for the containment of the highly corrosive titanium tetrachloride vapors. The size of the silica pipe has been limited to a maximum of about six inches, because current manufacturing techniques suitable for producing relatively flawless silica pipe apparently are limited to a maximum of about six inches. Also, the strength and integrity of the welded silica pipe joints decreases with increasing diameters and breakage has been more probable with higher diameter silica pipes. The maximum permissible pressures within the silica pipe decreases with increasing diameters and above six inch diameter silica pipes might result in working pressures insufficient to efficiently drive the titanium tetrachloride vapors downstream from the titanium tetrachloride vapor preheating equipment.

Also, the injection of auxiliary fuels, such as carbon monoxide and methane, for example, directly into the reactor to stabilize the flame in the reactor has been suggested as a means for lowering the temperature level requirements for the titanium tetrachloride vapors, thereby increasing the capacity of existing titanium tetrachloride vapor preheating equipment, the silica pipe preheaters. However, this approach leads only to minor reduction in the temperature required for the titanium tetrachloride vapors, such reduction being in the range of about 200° F. to about 500° F. Thus, the titanium tetrachloride vapors still would have to be preheated to significantly high temperatures where titanium tetrachloride corrosion problems still would exist. In addition, the combustion products from the reactor utilizing this approach diluted the chlorine recycle gas and resulted in larger capacity downstream equipment being required to process the increased gas load.

Shown in FIGS. 1 and 2 is a reactor 10 which is constructed in accordance with the present invention for use in a process for producing titanium dioxide by vapor-phase oxidation of titanium tetrachloride. In general, the reactor 10 comprises: an oxidizing gas introduction assembly 12 which is adapted to receive oxygen from oxygen preheat equipment 14 by way of a flowline 16 and pass the oxygen into a first reaction zone 18 formed in the reactor 10; a first titanium tetrachloride vapor introduction assembly 20 which is adapted to receive titanium tetrachloride vapor at an elevated first temperature level from first titanium tetrachloride preheat equipment 22 by way of a flowline 24 and to pass the titanium tetrachloride vapor at the first temperature level into the first reaction zone 18; and a second titanium tetrachloride vapor introduction assembly 26 which is adapted to receive titanium tetrachloride vapor at a second temperature level, substantially less than the first temperature level, from second titanium tetrachloride preheat equipment 28 by way of a flowline 30 and to pass the titanium tetrachloride vapor at the second temperature level into a second reaction zone 32, the mixture from the first reaction zone 18 being passed into the second reaction zone 32 for reacting with the titanium tetrachloride vapors at the second temperature level which simultaneously are being passed into the second reaction zone 32.

The oxidizing gas introduction assembly 12 includes a tubular conduit 34 having a downstream end 36, an upstream end 38 and an opening 39 extending axially therethrough. The conduit 34 generally is cylindrically shaped and has a length 40 extending generally between the downstream and the upstream ends 36 and 38. The conduit 34 has an internal diameter 41.

The oxidizing gas introduction assembly 12 also includes a cylindrically shaped case 42 having a downstream end 44, an opposite upstream end 46 and an opening 47 extending axially therethrough. A downstream end wall 48 is secured to the downstream end 44 and an upstream end wall 50 is secured to the upstream end 46 of the case 42.

The inner diameter of the case 42 formed by the opening 47 is larger than the outer diameter of the conduit 34 and the upstream end 38 of the conduit 34 extends through a central portion of the downstream end wall 48 so that a portion of the conduit 34, generally near the upstream end 38 is disposed within a portion of the opening 47 in the case 42, the upstream end 38 being spaced a distance from the upstream end wall 50. The space between the inner wall formed by the opening 47 extending through the case 42 and the outer peripheral surface of the conduit 34 cooperate to form a gas chamber 52 and the space between the upstream end 38 of the conduit 34 and the upstream end wall 50 cooperate to form a slot 54 for providing fluidic communication between the gas chamber 52 and the opening 39 in the conduit 34.

As shown in FIGS. 1 and 2, one end of the flowline 16, opposite the end of the flowline 16 which is connected to the oxygen preheat equipment 14, is connected to the case 42, so the flowline 16 provides fluidic communication between the oxygen preheat equipment 14 and the gas chamber 52.

In one embodiment, as shown in FIGS. 1 and 2, an injection tube 56 is disposed through a central portion of the upstream end wall 50 and the injection tube 56 extends a distance axially through a central portion of the opening 39 in the conduit 34. As mentioned in U.S. Pat. No. 3,512,219, issued to Stern, et al., it sometimes is advantageous in the operation of a reactor of the reactor 10 type to introduce an inert, particulate material into the flow of gases through such a reactor and the injection tube 56 provides a means for injecting such material.

The first titanium tetrachloride introduction assembly 20 includes a cylindrically shaped case 58 having an upstream end 60, a downstream end 62 and an opening 64 extending axially therethrough. An upstream end wall 66 is secured to the upstream end 60 and a downstream end wall 68 is secured to the downstream end 62 of the case 58.

The inner diameter of the case 58 formed by the opening 64 is larger than the outer diameter of the conduit 34, and the downstream end 36 of the conduit 34 extends through a central portion of the upstream end wall 66 so that a portion of the conduit 34, generally near the downstream end 36, is disposed within a portion of the opening 64 in the case 58. The space between the inner wall formed by the opening 64 extending through the case 58 and the outer peripheral surface of the conduit 34 cooperate to form a first titanium tetrachloride chamber 70.

As shown in FIG. 2, one end of the flowline 24, opposite the end of the flowline 24 which is connected to the first titanium tetrachloride preheat equipment 22, is connected to the case 58, so the flowline 24 provides fluidic communication between the first titanium tetrachloride preheat equipment 22 and the first titanium tetrachloride chamber 70. In one embodiment, the flowline 24 is connected to the case 58 in an offset manner so that titanium tetrachloride vapor is passed from the flowline 24 and tangentially injected into the first titanium tetrachloride chamber 70 to introduce a circular or swirling motion to such titanium tetrachloride vapors. For similar reasons, the flowline 16 is connected to the case 42 of the oxidizing gas introduction assembly 12 in a similar manner so the oxidizing gas is passed into the oxygen chamber 52 tangentially to introduce a circular or swirling motion to the oxidizing gas in the embodiment of the reactor 10 shown in FIGS. 1 and 2.

The reactor 10 includes a frusto-conical section 72 having a downstream end 74, an upstream end 76 and an opening 78 extending axially therethrough intersecting the downstream and upstream ends 74 and 76. The section 72 has an inner diameter 80 formed by the opening 78, generally at the upstream end 76, an inner diameter 82 formed by the opening 78, generally at the downstream end 74, and the opening 78 in the section 72 diverges generally outwardly at an angle 84. The section 72 has a length 86 extending generally between the downstream and the upstream ends 74 and 76.

The upstream end 76 of the section 72 extends through a central portion of the downstream end wall 68. The upstream end 76 of the section 72 is spaced a distance 88 axially from the downstream end 38 of the conduit 34, thereby forming a slot 89 in the first titanium tetrachloride chamber 70 providing fluidic communication between the chamber 70 and the opening 78 in the section 72. The opening 78 in the section 72 is axially aligned with the opening 39 in the conduit 34.

The second titanium tetrachloride introduction assembly 26 spaced a distance in a downstream direction from the first titanium tetrachloride assembly 20, and the second titanium tetrachloride introduction assembly 26 includes a cylindrically shaped case 90 having a downstream end 92, an upstream end 94 and an opening 96 extending axially therethrough. An upstream end wall 98 is secured to the upstream end 94 and a downstream end wall 100 is secured to the downstream end 92 of the case 90.

The inner diameter of the case 90 formed by the opening 96 is larger than the outer diameter of the section 72, and the downstream end 74 of the section 72 extends through a central portion of the upstream end wall 98, so that a portion of the section 72, generally near the downstream end 74, is disposed within a portion of the case 90. The space between the inner wall formed by the opening 96 extending through the case 90 and the outer peripheral surface of the section 72, generally near the downstream end 74 of the section 72, cooperate to form a second titanium tetrachloride chamber 102.

The flowline 30, opposite the end of the flowline 30 which is connected to the second titanium tetrachloride preheat equipment 28, is connected to the case 90, so the flowline 30 provides fluidic communication between the second titanium tetrachloride preheat equipment 28 and the second titanium tetrachloride chamber 102. In one embodiment, the flowline 30 is connected to the case 90 in an offset manner similar to that described before with respect to the flowlines 16 and 24, so the titanium tetrachloride vapor is passed from the flowline 30 and tangentially injected into the second titanium tetrachloride chamber 102 to introduce a circular motion or swirling action to such titanium tetrachloride.

The reactor 10 includes another frusto-conical section 104 having a downstream end 106, an upstream end 108 and an opening 110 extending axially therethrough intersecting the downstream and the upstream ends 106 and 108. The section 104 has an inner diameter 112 formed by the opening 110 generally at the upstream end 108, an inner diameter 114 formed by the opening 110, generally at the downstream end 106, and the opening 110 in the section 104 diverges generally outwardly at an angle 116. The section 104 has a length 118 extending generally between the downstream and the upstream ends 106 and 108.

The upstream end 108 of the section 104 extends through a central portion of the downstream end wall 100. The upstream end 108 of the section 104 is spaced a distance 120 axially from the downstream end 74 of the section 72, thereby forming a slot 122 in the second titanium tetrachloride chamber 102 providing fluidic communication between the chamber 102 and the opening 110 in the section 104. The opening 110 in the section 104 is axially aligned with the opening 78 in the section 72.

The reactor 10 includes a cooling tube 124 having an upstream end 126 and an opening 128 extending therethrough intersecting the upstream end 126 and the downstream end (not shown in the drawings). The cooling tube 124 has an internal diameter formed by the opening 128.

The oxygen preheat equipment 14 is contructed to heat the oxygen gas to a temperature level of about 1800° F., in one example preferred embodiment. Oxygen preheat equipment which is constructed to preheat oxygen gas to a temperature level of about 1800° F. for use in a process for producing titanium dioxide by vapor-phase oxidation of titanium tetrachloride is commercially available and such equipment is well known in the art.

In this example embodiment, the first titanium tetrachloride preheat equipment 22 is constructed to heat titanium tetrachloride vapors to a first temperature level of about 1800° F. Titanium tetrachloride preheat equipment which is constructed to heat titanium tetrachloride vapors to the first temperature level of about 1800° F. for use in a process for producing titanium dioxide by vapor-phase oxidation of titanium tetrachloride is commercially available and such equipment is well known in the art. In one embodiment, for example, the titanium tetrachloride first is heated and vaporized in a shell-and-tube type heat exchanger operating at a temperature level of about 350° F. and, then, the titanium tetrachloride is superheated to the first temperature level of above 1600° F. in the silica pipe type of heater. One type of heater which is useful in heating and vaporizing the titanium tetrachloride at temperature levels of about 400° F. is a shell-and-tube heat exchanger with a u-shaped tube bundle of nickel and glass-lined carbon steel sheel manufactured by The Pfaudler Company, for example. The tube-side heating medium is steam, but may, at temperatures approaching 400° F., be some other heat transfer fluid such as Dowtherm, available from Dow Chemical Co., for example, should suitable steam pressure be unavailable. One silica pipe heater which is useful for receiving the titanium tetrachloride at about 400° F. and for superheating the titanium tetrachloride to the first temperature level of above 1600° F. is a tubular radiant-heat furnace with vertical silica pipe, manufactured by Selas Corporation of America, for example.

In this example embodiment, the second titanium tetrachloride preheat equipment 28 is constructed to preheat and vaporize titanium tetrachloride vapor at the second temperature level of about 350° F. This titanium tetrachloride can be heated and vaporized in the same type of heat exchanger employed in the first preheat step described above, and which is not subject to the capacity limitations presently existing with respect to the silica pipe heaters utilized in heating titanium tetrachloride to the elevated, relatively high temperature levels, such as the 1800° F. temperature level, for example.

In this example embodiment, a suitable reactor 10 would have the following approximate dimension values by way of example and for the purpose of illustrating the present invention.

| | |
|---|---|
| the inner diameter of the flowline 16 entering the first oxidizing gas introduction assembly | 3 inches |
| the inner diameter 41 of the conduit 34 | 4 inches |
| the outer diameter of the injection tube 56 | 1 inch |
| the inner diameter of the flowline 24 entering the first titanium tetrachloride introduction assembly 20 | 4 inches |
| the length 40 | 24 inches |
| the distance 88 with respect to slot 89 | 0.6 inches |
| the diameter 80 of section 72 | 4 inches |
| the diameter 82 of section 72 | 6 inches |
| the length 86 | 24 inches |
| the angle 84 | 2.5 degrees |
| the inner diameter of | 3 inches |

| -continued | |
|---|---|
| the flowline 30 entering the second titanium tetrachloride introduction assembly 26 | |
| the distance 120 with respect to slot 122 | 0.3 inches |
| the diameter 112 of section 104 | 6 inches |
| the diameter 114 of section 104 | 8 inches |
| the distance 118 of section 104 | 24 inches |
| the angle 116 | 2.5 degrees |

In this example embodiment and assuming a capacity of 100 tons per twenty-four hour period of titanium dioxide produced utilizing the reactor 10, the flow of oxygen gas into the oxidizing gas introduction assembly 12 and through the reactor 10 is about 120 pound mole per hour, the flow of titanium tetrachloride at the first temperature level into the first titanium tetrachloride introduction assembly 20 and through the reactor 10 is about 52 pound mole per hour and the flow of titanium tetrachloride at the second temperature level into the second titanium tetrachloride introduction assembly 26 and through the reactor 10 is about 52 pound mole per hour. In this example embodiment, about one pound mole per hour of oxygen together with two hundred pounds per hour of sand is passed through the injection tube 56.

In operation, oxygen is preheated in the oxygen preheat equipment 14 to the predetermined temperature level and the preheated oxygen is passed at a controlled, predetermined rate through the flowline 16 to the oxidizing gas introduction assembly 12. The oxidizing gas introduction assembly 12 receives the preheated oxygen and the preheated oxygen is passed into the oxygen chamber 52, through the slot 54 and through the opening 39 in the conduit 34 downstream into the first reaction zone 18.

Titanium tetrachloride is preheated in the first titanium tetrachloride preheat equipment 22 to the first predetermined temperature level and the preheated titanium tetrachloride vapors are passed through the flowline 24 at a controlled rate into the first titanium tetrachloride introduction assembly 20. The first titanium tetrachloride introduction assembly 20 receives the preheated titanium tetrachloride vapors and the preheated titanium tetrachloride vapors are passed in the first titanium tetrachloride chamber 70, through the slot 89 and into the first reaction zone 18, where the oxygen and the titanium tetrachloride at the first temperature level react to produce a mixture including particles of titanium dioxide, this mixture being passed downstream into the second reaction zone 32.

Titanium tetrachloride is preheated in the second titanium tetrachloride preheat equipment 28 to the predetermined second temperature level and the titanium tetrachloride vapors are passed at a controlled rate through the flowline 30 into the second titanium tetrachloride introduction assembly 26. The second titanium tetrachloride introduction assembly 26 receives the preheated titanium tetrachloride vapors and the titanium tetrachloride vapors are passed into the second titanium tetrachloride chamber 102, through the slot 122 and into the second reaction zone 32, where the titanium tetrachloride vapors at the second temperature level react with the oxygen in the mixture passed from the first reaction zone 18 to produce a mixture including additional titanium dioxide, the mixture from the second reaction zone 32 being passed downstream for further processing in a manner well known in the art of producing titanium dioxide by vaporphase oxidation of titanium tetrachloride.

In order to react the oxygen and the titanium tetrachloride vapors in a manner which ensures rutile as the dominant phase in the titanium dioxide product, the temperature in the reaction zones 18 and 32 must be above a minimum temperature level of about 2200° F.

The combined temperature of the reactants, prior to reaction, to produce the required reactions, must be at least 1600° F. to sustain the oxidation reaction and, preferably, the combined temperature of the reactants, before reaction, should be in the range of about 1650° F. to about 1800° F. In practice and in one operational process for producing titanium dioxide by vapor-phase oxidation of titanium tetrachloride, the oxygen is preheated to a temperature level of 1800° F. and the titanium tetrachloride is preheated to a temperature level of above 1750° F. or about 1800° F. In this operational process, the oxygen and the titanium tetrachloride vapors are reacted in a reaction zone utilizing a reactor like that disclosed in Stern, et al., U.S. Pat. No. 3,512,219 to produce a mixture including titanium dioxide, and the mixture (product of reaction) is passed downstream for further processing.

The reaction of the titanium tetrachloride vapors with the oxygen to form the titanium dioxide is exothermic. In a completely adiabatic system, a reaction temperature of about 2400° F. is attainable, starting with 350° F. TiCl4 vapor and 77° F. oxygen, which is above the minimum temperature of 2200° F. required to insure rutile as the dominate phase in the titanium dioxide product of reaction. The system of the present invention utilizes this heat of reaction to reduce the preheat requirement for a portion of the titanium tetrachloride vapors utilized.

Utilizing only the first reaction zone and assuming a flow of oxygen from the oxygen preheat assembly 14 of 60 pound moles per hour at a temperature level of about 1800° F. and assuming a flow of titanium tetrachloride from the first titanium tetrachloride preheat assembly 28 of 52 pound moles per hour at a temperature level of about 1800° F., about 4150 pounds per hour of titanium dioxide are produced and the heat of reaction in the first reaction zone, assuming a completely adiabatic system, will generate a temperature of above 2400° F., which is well above the minimum temperature level required to ensure rutile as the dominant phase in the titanium dioxide product.

Assuming a plant existed operating with a single reaction zone reactor as mentioned above, the equipment associated with the first titanium preheat assembly 28 already is in existence and the silica pipe heater portion of this equipment is relatively expensive equipment due to the corrosive nature of the titanium tetrachloride at the first temperature level of about 1800° F. In this situation, the reactor 10 can be substituted for the single reaction zone reactor, additional equipment can be added to the oxygen preheat assembly 14 to increase the capacity of such oxygen preheat assembly 14 so that about 120 pound moles per hour are preheated by the oxygen preheat assembly 14, and the second titanium tetrachloride preheat assembly 28 can be added for preheating titanium tetrachloride to the second temperature level of about 350° F. and for passing about 52 pound moles per hour into the second reaction zone 32. Under these conditions, about one-half of the oxygen will react with the titanium tetrachloride in the first reaction zone 18 and the mixture including the excess oxygen will reach a temperature level of above 2400° F. due to the heat of reaction and assuming a completely adiabatic system. This mixture is passed from the first reaction zone into the second reaction zone 32 wherein the excess oxygen in the mixture will combine with the titanium tetrachloride vapors at the second temperature level which are being passed into the second reaction zone 32 from the second titanium tetrachloride preheat assembly 28 and the temperature level of this combined mixture will be above 1800° F. which is sufficient to sustain the oxidation reaction. Thus, the excess oxygen in the mixture passed from the first reaction zone 18 will react with the titanium tetrachloride vapors at the second temperature level in the second reaction zone to produce additional titanium dioxide product. Under these assumed conditions, the reactor 10 will produce about 8300 pounds per hour of the titanium dioxide product. Thus, utilizing the reactor 10 of the present invention with two reaction zones 18 and 32, about twice the amount of titanium dioxide product is produced without the necessity of adding any additional titanium tetrachloride preheat equipment capable of heating the titanium tetrachloride to the first temperature level of about 1800° F. and in a manner wherein it only was necessary to add the second titanium tetrachloride preheat assembly 28 which is capable of heating the titanium tetrachloride to the lower temperature level of about 350° F. Utilizing the system of the present invention, the capacity of a plant almost can be doubled without a corresponding doubling of the costs of equipment. Of course, a new plant also can be constructed for substantially less investment in equipment per pound of titanium dioxide produced.

It should be noted that, in some embodiments, it may be desirable to utilize a shell-and-tube heat exchanger to heat and vaporize the titanium tetrachloride at the second temperature level of about 350° F. and a portion of the titanium tetrachloride at the second temperature level of about 350° F. can be fed or passed into the second reaction zone 32, while the remaining portion of the titanium tetrachloride at the second temperature level can be fed or passed to the silica pipe type of heaters wherein the titanium tetrachloride is heated to the first temperature level of about 1750° F. In other applications, it may be desirable to utilize two, separate shell-and-tube heat exchangers in the first and second titanium tetrachloride preheat assemblies 22 and 28.

It should be noted that, in a preferred embodiment, the walls of the reactor 10 are cooled (fluid cooling) to protect the walls and to reduce titanium dioxide deposition on the walls. Also, other reagents, such as aluminum chloride and water vapor, are added through the conduit 34 for controlling or modifying pigment (titanium dioxide) properties in an operational embodiment of the reactor 10.

Embodiment of FIG. 3

Shown in FIG. 3 is a modified reactor 10a which is constructed exactly like the reactor 10 shown in FIGS. 1 and 2 and described in detail above, except the conduits 16, 24 and 30 are not offset at the connections to the respective cases 42, 58 and 90. Rather, the conduits 16, 24 and 30 each are connected to the respective case 42, 58 and 90 at and along the vertical centerlines of the cases 42, 58 and 90. In FIG. 3, only the conduit 24 specifically is shown; however, the conduits 16 and 30 each are connected to the respective cases 58 and 90 in a manner exactly like that shown in FIG. 3 with respect to the conduit 24 and described above.

Embodiment of FIG. 4

Shown in FIG. 4 is one embodiment of the system of the present invention. The first titanium tetrachloride preheat assembly 22 is a silica pipe type of preheater and the second titanium tetrachloride preheat assembly 28 is a shell-and-tube type of heat exchanger. In this embodiment, titanium tetrachloride is added to the shell-and-tube heat exchanger 28 through a conduit 150 and a heat exchange medium, such as steam, for example, is passed through a conduit 152 into and through the tubes within the shell-and-tube heat exchanger 28, the heat exchange medium being passed from the tubes in the shell-and-tube heat exchanger 28 through a conduit 154. The shell-and-tube heat exchanger 28 heats the titanium tetrachloride to the predetermined second temperature level and the titanium tetrachloride heated to the second temperature level is passed from the shell-and-tube heat exchanger 28 through a conduit 156.

A portion of the titanium tetrachloride heated to the predetermined second temperature level is passed from the shell-and-tube heat exchanger 28 through the conduit 156 and through a conduit 158 into the first titanium tetrachloride preheat assembly 22 (the silica pipe preheater 22). The silica pipe preheater first titanium tetrachloride assembly 22 heats the titanium tetrachloride to the predetermined first temperature level and passes the heated titanium tetrachloride from the silica pipe preheater first titanium tetrachloride assembly 22 into the first titanium tetrachloride introduction assembly 20 in the reactor 10.

Another predetermined portion of the titanium tetrachloride heated to the predetermined second temperature level by the shell-and-tube heat exchanger second titanium tetrachloride preheat assembly 28 is passed through the conduit 156 into the conduit 30. The titanium tetrachloride heated to the predetermined second temperature level is passed through the conduit 30 into the second titanium tetrachloride introduction assembly 26.

In this embodiment, preferably aluminum chloride is mixed with the titanium tetrachloride and the mixture of titanium tetrachloride and aluminum chloride are passed through the conduit 150 into the shell-and-tube heat exchanger second titanium tetrachloride preheat assembly 28. Thus, with this arrangement, the mixture of titanium tetrachloride and aluminum chloride is passed into both of the first and the second titanium tetrachloride introduction assemblies 20 and 26 in the reaction 10. Also, in this embodiment, the shell-and-tube heat exchanger second titanium tetrachloride preheat assembly 28 actually functions as a portion of the first titanium tetrachloride preheat assembly 22, since the shell-and-tube heat exchanger second titanium tetrachloride preheat assembly 28 heats the titanium tetrachloride to the predetermined second temperature level and a portion of this preheated titanium tetrachloride is passed into the silica pipe preheater first titanium tetrachloride preheat assembly 22.

Figure 5:
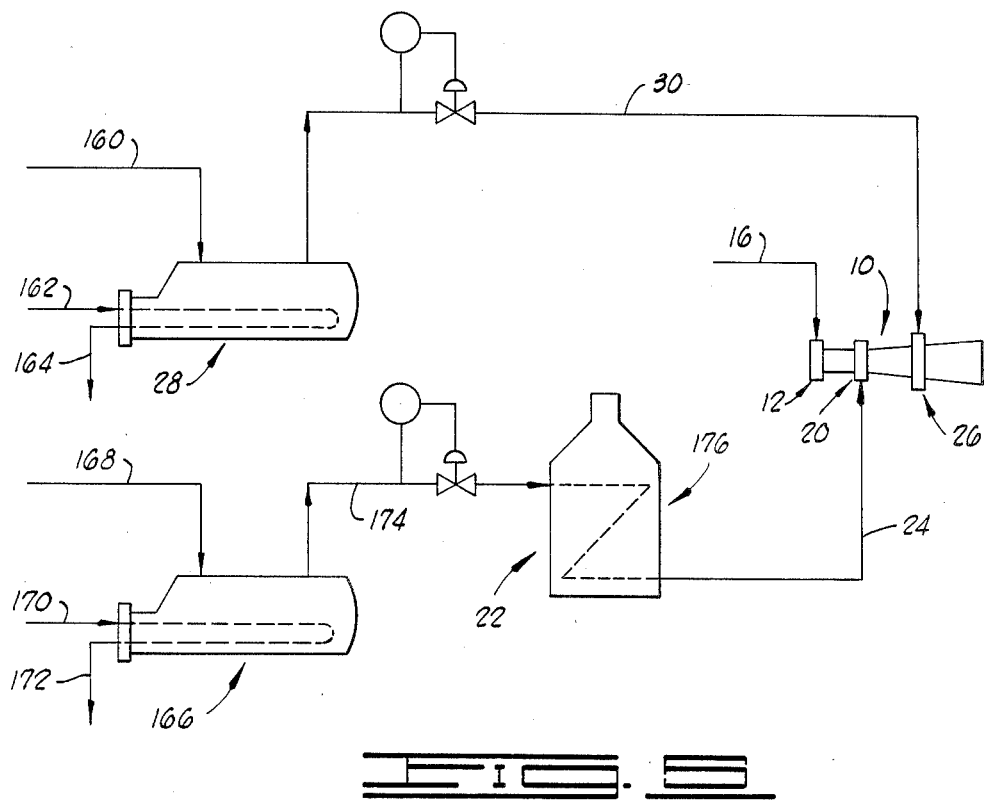
FIG. 5 is a diagrammatic view, similar to FIG. 4, but showing another embodiment of the present invention.

Embodiment of FIG. 5

The system shown in FIG. 5 is similar to the system shown in FIG. 4.

The second titanium tetrachloride preheat assembly 28 comprises a shell-and-tube heat exchanger wherein titanium tetrachloride is passed into the shell-and-tube heat exchanger second titanium tetrachloride preheat assembly 28 through a conduit 160 and a heat exchange medium, such as steam, for example, is passed into the tubes within the shell-and-tube heat exchanger second titanium tetrachloride preheat assembly 28 through a conduit 162, the heat exchange medium being passed from the shell-and-tube heat exchanger second titanium tetrachloride preheat assembly 28 through a conduit 164. The shell-and-tube heat exchanger second titanium tetrachloride preheat assembly 28 preheats the titanium tetrachloride to the predetermined second temperature level and passes the heated titanium tetrachloride through the conduit 30 into the second titanium tetrachloride introduction assembly.

The first titanium tetrachloride preheat assembly 22 includes a shell-and-tube heat exchanger 166 which receives titanium tetrachloride through a conduit 168 and which receives a heat exchange medium through a conduit 170, the heat exchange medium being passed from the shell-and-tube heat exchanger 166 through a conduit 172. The shell-and-tube heat exchanger 166 preheats the titanium tetrachloride to a predetermined temperature level and passes the preheated titanium tetrachloride through a conduit 174 into a silica pipe preheater 176. The silica pipe preheater 176 preheats the received titanium tetrachloride to the predetermined first temperature level and passes the preheated titanium tetrachloride through the conduit 24 into the first titanium tetrachloride introduction assembly 20.

In some applications, it may be desirable to pass a mixture of aluminum chloride and titanium tetrachloride only into the second titanium tetrachloride introduction assembly 26. In those applications, a single shell-and-tube heat exchanger cannot function to preheat the titanium tetrachloride both for passing the preheated titanium tetrachloride into the second titanium tetrachloride introduction assembly and for passing the preheated titanium tetrachloride to a silica pipe preheater, as shown in the embodiment of the present invention shown in FIG. 4. In those applications, the mixture of titanium tetrachloride and aluminum chloride are passed into the second titanium tetrachloride preheat assembly 28 through the conduit 160 and titanium tetrachloride alone is passed into the shell-and-tube heat exchanger 166 of the titanium tetrachloride preheat assembly 22 through the conduit 168.

Embodiment of FIG. 6

Shown in FIG. 6 is a modified construction of an introduction assembly 200 which preferably is utilized in lieu of the construction of the titanium tetrachloride introduction assemblies 26, shown in FIG. 1. Also, the introduction assembly 200 may be utilized in lieu of the titanium tetrachloride introduction assembly 20 and the oxidizing gas introduction assembly 12.

The introduction assembly 200 includes a cylindrical inner case 202 having an upstream end 204, a downstream end 206 and an opening 208 extending axially therethrough intersecting the upstream and downstream ends 204 and 206 thereof. A flange 210 is formed on the downstream end 206, the flange 210 extending radially a distance from the outer peripheral surface of the inner case 202. The inner case 202 has an inner diameter 212 and an outer diameter 214 which is provided by the outer peripheral surface of the inner case 202.

The introduction assembly 200 also includes an outer case 216 which has an upstream end 218, a downstream end 220 and an opening 222 which extends axially therethrough. The opening 222 forms an inner diameter 224 and the outer peripheral surface forms an outer diameter 226 of the outer case 216. The inner diameter 224 of the outer case 216 is larger than the outer diameter 214 of the inner case 202. A flange 228 is formed on the upstream end 218 of the outer case 216 and the flange 228 extends a distance radially from the outer peripheral surface of the outer case 216.

In an assembled position of the introduction assembly 200, the inner case 202 is disposed in the opening 222 in the outer case 216. The downstream end 220 of the outer case 216 is secured to the downstream end 206 of the inner case 202 or, more particularly, the downstream end 220 is secured to the flange 210 formed on the downstream end 206 of the inner case 202.

In the connected position of the outer and inner cases 216 and 202, the outer peripheral surface of the inner case 202 is spaced a distance 230 from the inner surface formed by the opening 222 in the outer case 216, the space between the inner and outer cases 202 and 216 forming a chamber 232. A plurality of spaced apart rods 234 are connected to the inner and the outer cases 202 and 216, generally near the respective upstream ends 204 and 218 for the purpose of providing additional structural integrity to the connection between the inner and the outer cases 202 and 216.

A downstream end 236 of a first tube 238 is connected to the upstream end 218 of the outer case 216. The first tube 238 has an opening 240 extending therethrough which, in the assembled position, is axially aligned with the opening 208 in the inner case 202. The downstream end 236 is spaced a distance 242 axially from the upstream end 204 of the inner case 202 thereby forming a slot 250 which is in fluidic communication with the chamber 232 and the opening 208 in the inner case 202.

An upstream end 252 of a second tube 254 is connected to the downsteam end 206 of the inner case 202. The second tube 254 has an opening 256 which extends axially therethrough and the opening 256 is axially aligned with the opening 208 in the inner case 202 and the opening 240 in the first tube 238.

When the introduction assembly 200 is utilized in the reactor 10, the first tube 238 would be either the conduit 34 or the first section 72 depending on whether the introduction assembly 200 is replacing the first or the second titanium tetrachloride introduction assembly 20 or 26, as shown in FIG. 1. The second tube 254 would be either the section 72 or the section 104 depending on whether the introduction assembly 200 is replacing the first or the second titanium tetrachloride introduction assembly 20 or 26, as shown in FIG. 1.

A flowline 260 is connected to the outer case 216 for passing preheated titanium tetrachloride vapors from a titanium tetrachloride preheat assembly (not shown in FIG. 6) into the titanium tetrachloride chamber 232. The flowline 260 would be the flowline 24 or 30 depending on whether the introduction assembly 200 is replacing the first or the second titanium tetrachloride introduction assemblies 20 or 26, as shown in FIG. 1. The titanium tetrachloride vapors pass from the chamber 232 through the slot 188 and into the openings 208 and 256 in the inner case 202 and the second tube 254, respectively.

Changes may be made in the construction and operation of the various assemblies and elements disclosed herein or in the steps or the sequence of the steps disclosed herein without departing from the spirit and the scope of the invention as defined in the following claims.

What is claimed is:

1. A reactor for use in producing titanium dioxide by reacting titanium tetrachloride vapors with oxygen comprising:
   means for forming a first reaction zone;
   an oxidizing gas introduction assembly for receiving oxygen at a predetermined temperature level and passing the oxygen into the first reaction zone, the oxidizing gas introduction assembly comprising:
      a conduit having an upstream and a downstream end and an opening extending therethrough intersecting the upstream and the downstream ends and the oxygen being passable through the opening in the conduit for passing the oxygen into the first reaction zone;
   a first titanium tetrachloride introduction assembly for receiving titanium tetrachloride vapors at a first predetermined temperature level and passing the titanium tetrachloride vapors at the first temperature level into the first reaction zone for reacting with the oxygen to produce a mixture including titanium dioxide, the first titanium tetrachloride introduction assembly comprising:
      a cylindrically shaped outer case having an upstream end, a downstream end and an opening extending axially therethrough intersecting the upstream and downstream ends;
      a cylindrically shaped inner case having an upstream end, a downstream end and an opening extending axially therethrough intersecting the upstream and the downstream ends, the inner case being disposed in the opening in the outer case and the diameter of the outer case provided by the surface formed by the opening extending through the outer case being greater than the diameter formed by the outer peripheral surface of the inner case thereby providing a space between the outer case and the inner case forming a first titanium tetrachloride chamber, one of the upstream and the downstream ends of the inner case being spaced a distance axially from the respective one of the upstream and the downstream ends of the outer case for forming a slot to pass titanium tetrachloride vapors from the first titanium tetrachloride chamber;
      a downstream end wall secured to the downstream end of one of the inner and the outer cases;
      an upstream end wall secured to the upstream end of one of the inner and the outer cases, the downstream end of the conduit being removably secured to the upstream end wall for passing the oxidizing gas from the oxidizing gas introduction assembly to the first titanium tetrachloride introduction through the upstream end wall, the upstream and the downstream end walls cooperating to secure the inner and the outer cases in the spaced apart relationship for forming the slot to pass titanium tetrachloride vapors from the first titanium tetrachloride chamber; and
      means for passing the titanium tetrachloride vapor at the first temperature level into the first titanium tetrachloride chamber; and
   wherein the means for forming the first reaction zone is defined further to include:
      a section having an upstream end, a downstream end and an opening extending axially therethrough intersecting the upstream and downstream ends, the upstream end of the section being removably secured to the downstream end wall of the first titanium tetrachloride introduction assembly, the opening extending through the section cooperating to form the first reaction zone, the upstream and downstream end walls of the first titanium tetrachloride introduction assembly respectively being removably secured to the conduit of the oxidizing gas introduction assembly and the section of the first reaction zone to facilitate the removal or insertion of the first titanium tetrachloride introduction assembly from the conduit of the oxidizing gas introduction assembly and the section of the first reaction zone without disassembly of said conduit, said section and the first titanium tetrachloride introduction assembly.

2. The reactor of claim 1 wherein the opening through the section of the first reaction zone is defined further as being axially aligned with the opening in the conduit.

3. The reactor of claim 1 wherein the opening through the section of the first reaction zone is defined further as diverging outwardly at a predetermined angle generally from the upstream end toward the downstream end of the section.

4. The reactor of claim 1 defined further to include:
   oxygen preheat equipment for heating oxygen to the predetermined temperature level; and
   means for passing the heated ocygen from the oxygen preheat equipment to the oxidizing gas introduction assembly.

5. The reactor of claim 1 defined further to include:
   means for forming a second reaction zone spaced a distance downstream from the first reaction zone;
   a second titanium tetrachloride introduction assembly for receiving titanium tetrachloride vapors at a second predetermined temperature level substantially lower than the first temperature level and passing the titanium tetrachloride vapors at the second temperature level into the second reaction zone for reaction with oxygen in the mixture from the first reaction zone to produce a mixture including titanium dioxide, the reaction of the titanium tetrachloride vapors at the second temperature level with the mixture passed from the first reaction zone reducing the volume of titanium tetrachloride vapors at the first temperature level required for a given volume of titanium dioxide produced, the second titanium tetrachloride introduction assembly comprising:
      a cylindrically shaped outer case having an upstream end, a downstream end and an opening extending axially therethrough intersecting the upstream and downstream ends;
      a cylindrically shaped inner case having an upstream end, a downstream end and an opening extending axially there through intersecting the upstream and the downstream ends, the inner case being disposed in the opening in the outer case and the diameter of the outer case provided by the surface formed by the opening extending through the outer case being greater than the diameter formed by the outer peripheral surface of the inner case thereby providing a space between the outer case and the inner case forming a second titanium tetrachloride chamber, one of the upstream and downstream ends of the inner case being spaced a distance axially from the respective one of the upstream and the downstream ends of the outer case for forming a slot to pass titanium tetrachloride vapors from the second titanium tetrachloride chamber;

a downstream end wall removably secured to the downstream end of one of the inner and the outer cases, the means for forming the second reaction zone being secured to the downstream end wall;

an upstream end wall secured to the upstream end of one of the inner and the outer cases, the downstream end of the section being removably secured to the upstream end wall for passing the mixture from the first reaction zone through the upstream end wall and through the second titanium tetrachloride introduction assembly and into the second reaction zone, and the upstream and the downstream end walls cooperating to secure the inner and the outer cases in the spaced apart relationship for forming the slot to pass titanium tetrachloride vapors from the second titanium tetrachloride chamber, the upstream and the downstream end walls of the second titanium tetrachloride introduction assembly respectively being removably secured to the means for forming the second reaction zone and the section comprising the first reaction zone to facilitate removal of the second titanium tetrachloride introduction assembly from the means for forming the second reaction zone and the section comprising the first reaction zone to facilitate the removal or insertion of the second titanium tetrachloride assembly from the means forming the second reaction zone and the section comprising the first reaction zone without disassembly of the means forming the first reaction zone, the section comprising the first reaction zone and the second titanium tetrachloride introduction assembly; and means for passing the titanium tetrachloride vapor at the second temperature level into the second titanium tetrachloride chamber.

6. The reactor of claim 5 wherein the oxidizing gas introduction assembly is defined further to include:

a cylindrically shaped outer case having an upstream end, a downstream end and an opening extending axially therethrough intersecting the upstream and the downstream ends;

a cylindrically shaped inner case having an upstream end, a downstream end and an opening extending therethrough intersecting the upstream and the downstream ends, the inner case being disposed in the opening in the outer case and the diameter of the outer case provided by the surface formed by the opening extending through the outer case being greater than the diameter formed by the outer peripheral surface of the inner case thereby providing a space between the outer case and the inner case forming a gas chamber, one of the upstream and downstream ends of the inner case being spaced a distance axially from the respective one of the downstream and upstream ends of the outer case for forming a slot to pass oxygen from the gas chamber;

an upstream end wall secured to the upstream end of one of the inner and outer cases;

a downstream end wall secured to the downstream end of one of the inner and the outer cases, the upstream end of the conduit being removably secured to the upstream end wall, and the upstream and downstream end walls cooperating to secure the inner and the outer cases in the spaced apart relationship for forming the slot for passing oxygen from the gas chamber, the upstream and the downstream end walls of the oxidizing gas introduction assembly respectively being removably secured to the conduit of the oxidizing gas introduction assembly to facilitate the removal or insertion of the inner and the outer cases in the upstream and the downstream end walls of the oxidizing gas introduction assembly without disassembling the conduit of the oxidizing gas introduction assembly; and means for passing the oxygen into the oxygen chamber.

7. The reactor of claim 5 wherein the opening through the section of the second reaction zone forming the second reaction zone is defined further as being axially aligned with the opening through the section forming the first reaction zone.

8. The reactor of claim 5 wherein the opening through the section of the second reaction zone forming the second reaction zone is defined further as diverging outwardly at a predetermined angle generally from the upstream end toward the downstream end of the section forming the second reaction zone.

9. The reactor of claim 5 defined further to include:
a first titanium tetrachloride preheat equipment for preheating titanium tetrachloride vapors to the first temperature level; and
means for passing the titanium tetrachloride vapors from the first titanium tetrachloride preheat equipment to the first titanium tetrachloride introduction assembly.

10. The reactor of claim 9 defined further to include:
a second titanium tetrachloride preheat equipment for preheating titanium tetrachloride vapors to the second temperature level; and
means for passing the titanium tetrachloride vapors from the second titanium tetrachloride preheat equipment to the second titanium tetrachloride introduction assembly.

11. The reactor of claim 5 wherein the second temperature level is defined further as being below about 500° F.

12. The reactor of claim 11 wherein the first temperature level is defined further as being above about 1600° F.

13. A reactor for use in producing titanium dioxide by reacting titanium tetrachloride vapors with oxygen having means for forming a first reaction zone, an oxidizing gas introduction assembly for receiving oxygen at a predetermined temperature level and passing the oxygen into the first reaction zone, a first titanium tetrachloride introduction assembly for receiving titanium tetrachloride at a first predetermined temperature level and passing the titanium tetrachloride at the first temperature level into the first reaction zone for reacting with the oxygen to produce a mixture including titanium dioxide, the reactor comprising:

means for forming a second reaction zone spaced a distance downstream from the first reaction zone;

means for passing the mixture from the first reaction zone into the second reaction zone; and a second titanium tetrachloride introduction assembly for receiving titanium tetrachloride vapors at a second predetermined temperature level substantially lower than the first temperature level and passing the titanium tetrachloride vapors at the second temperature level into the second reaction zone for reaction with oxygen in the mixture from the first reaction zone to produce a mixture including titanium dioxide, the reacting of the titanium tetrachloride vapors at the second temperature level with the mixture passed from the first reaction zone reducting the volume of titanium tetrachloride vapors at the first temperature level required for a given volume of titanium dioxide produced, the second titanium tetrachloride introduction assembly comprising:

a cylindrically shaped outer case having an upstream end, a downstream end and an opening extending axially therethrough intersecting the upstream and downstream ends;

a cylindrically shaped inner case having an upstream end, a downstream end and an opening extending axially therethrough intersecting the upstream and the downstream ends, the inner case being disposed in the opening in the outer case and the diameter of the outer case provided by the surface formed by the opening extending through the outer case being greater than the diameter formed by the outer peripheral surface of the inner case thereby providing a space between the outer case and the inner case forming a second titanium tetrachloride chamber, one of the upstream and downstream ends of the inner case being spaced a distance axially from the respective one of the upstream and downstream ends of the outer case for forming a slot to pass titanium tetrachloride vapors from the second titanium tetrachloride chamber;

an upstream end wall secured to the upstream end of one of the inner and the outer cases, the upstream end wall being removably secured to the means forming the first reaction zone;

a downstream end wall secured to the downstream end of one of the inner and the outer cases, the upstream end well being connected to means for passing the mixture from the first reaction zone into the second reaction zone, and the upstream and the downstream end walls cooperating to secure the inner and the outer cases in the spaced apart relationship for forming the slot to pass titanium tetrachloride vapors from the second titanium tetrachloride chamber, the downstream end wall being removably secured to the means for forming the second reaction zone, the upstream and the downstream end walls of the second titanium tetrachloride introduction assembly respectively being removably secured to the means forming the first and the second reaction zones to facilitate the removal or insertion of the second titanium tetrachloride assembly from the means forming the first and the second reaction zones without disassembly of said means forming the first and the second reaction zones and the second titanium tetrachloride introduction assembly; and means for passing the titanium tetrachloride vapor at the second temperature level into the second titanium tetrachloride chamber.

* * * * *